United States Patent
Gilbert-Eyres et al.

(10) Patent No.: US 11,242,032 B2
(45) Date of Patent: Feb. 8, 2022

(54) CUSTOM VEHICLE ALARM BASED ON ELECTRONIC DEVICE IDENTIFIER

(71) Applicant: GM GLOBAL TECHNOLOGY OPERATIONS LLC, Detroit, MI (US)

(72) Inventors: Matthew E. Gilbert-Eyres, Rochester, MI (US); Matthew C. Neely, Rochester, MI (US); Eric T. Hosey, Royal Oak, MI (US); Huong T. Chim, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 548 days.

(21) Appl. No.: 16/215,715

(22) Filed: Dec. 11, 2018

(65) Prior Publication Data

US 2020/0180559 A1 Jun. 11, 2020

(51) Int. Cl.
*B60R 25/24* (2013.01)
*B60R 25/10* (2013.01)
*H04W 88/02* (2009.01)

(52) U.S. Cl.
CPC .............. *B60R 25/24* (2013.01); *B60R 25/10* (2013.01); *B60R 2025/1013* (2013.01); *B60R 2325/205* (2013.01); *H04W 88/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,323,762 B1* | 11/2001 | Ekpo, Jr. | ............... | B60R 25/305 |
| | | | | 340/426.35 |
| 8,326,328 B2* | 12/2012 | LeBeau | .................... | G10L 15/22 |
| | | | | 455/456.4 |
| 8,805,349 B2* | 8/2014 | Frye | ....................... | H04W 4/021 |
| | | | | 455/418 |
| 9,451,077 B2* | 9/2016 | Duvaut | .................... | H04W 4/48 |
| 9,672,719 B1* | 6/2017 | Hollenstain | ............. | H04W 4/00 |
| 9,799,015 B2* | 10/2017 | Ginder | ................. | G06Q 20/102 |
| 10,037,683 B1* | 7/2018 | Hosey | ..................... | H04L 12/40 |
| 10,880,708 B1* | 12/2020 | Kerr | ..................... | H04M 1/2745 |
| 2013/0244210 A1* | 9/2013 | Nath | .................... | G09B 19/167 |
| | | | | 434/65 |

(Continued)

OTHER PUBLICATIONS

U.S. Appl. No. 16/003,742, filed Jun. 8, 2018—System and Method to Securely Activate a Vehicle.

(Continued)

*Primary Examiner* — Redhwan K Mawari
(74) *Attorney, Agent, or Firm* — Lorenz & Kopf LLP

(57) ABSTRACT

In various embodiments, methods, systems, and vehicles are provided. In certain embodiments, a vehicle includes a sensor and a processor. The sensor is configured to at least facilitate detecting when a user is disposed within the vehicle. The processor is coupled to the sensor, and is configured to at least facilitate: identifying the user; retrieving, from a memory, a sequence of inputs that is associated with the identified user as a trigger for a customized silent alarm feature for the user; monitoring for the sequence of inputs while the user is disposed within the vehicle; and providing instructions for taking an action when the sequence of inputs is detected while the user is disposed within the vehicle.

17 Claims, 3 Drawing Sheets

(56) References Cited

U.S. PATENT DOCUMENTS

| | | | |
|---|---|---|---|
| 2013/0304276 A1* | 11/2013 | Flies | G07C 5/085 |
| | | | 701/1 |
| 2014/0240111 A1* | 8/2014 | Kleve | B60R 25/102 |
| | | | 340/426.18 |
| 2015/0120402 A1* | 4/2015 | Ahmed | G06Q 30/06 |
| | | | 705/13 |
| 2016/0371895 A1* | 12/2016 | Jayanthi | H04M 1/72403 |

OTHER PUBLICATIONS

U.S. Appl. No. 16/201,684, filed Nov. 27, 2018—Integrated Vehicle Silent Alarm SOS.

\* cited by examiner

CUSTOM VEHICLE ALARM BASED ON ELECTRONIC DEVICE IDENTIFIER

TECHNICAL FIELD

The technical field generally relates to vehicles, and more particularly relates to customizable alarm features for vehicles.

Certain vehicles today have alarm features, for example, that activate when an unauthorized person attempts to enter or access the vehicle. It may be desirable to expand the use of vehicle alarms in other contexts. For example, a user may desire an alarm feature for other vehicles that the user may enter.

Accordingly, it may be desirable to provide improved methods and systems for activating a vehicle alarm, for example in appropriate circumstances in which a user is in another vehicle. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes: identifying, via a processor, a user that is disposed within a vehicle; retrieving, from a memory, a sequence of inputs that is associated with the identified user as a trigger for a customized silent alarm feature for the user; monitoring for the sequence of inputs while the user is disposed within the vehicle; and taking an action, via instructions provided by the processor, when the sequence of inputs is identified while the user is disposed within the vehicle.

Also in one embodiment, the method further includes: detecting an electronic device associated with the user that is disposed within the vehicle, wherein: the step of identifying the user includes identifying an identifier associated the electronic device; the step of retrieving the sequence of inputs includes retrieving, from a memory, the sequence of inputs that is associated with the identifier; the step of monitoring for the sequence of inputs includes monitoring the sequence of inputs while the electronic device is disposed within the vehicle; and the step of taking the action includes taking the action, via instructions provided by the processor, when the sequence of inputs is detected while the electronic device is disposed within the vehicle.

Also in one embodiment, the electronic device includes a mobile phone associated with the user; and the identifier includes a media access control (MAC) address of the mobile phone.

Also in one embodiment, the sequence of inputs includes a sequence of vehicle action requests that have been pre-programmed by the user for the customized silent alarm feature for the user; the step of retrieving the sequence of inputs includes retrieving, from the memory, the sequence of vehicle action requests for the user; the step of monitoring for the sequence of inputs includes monitoring for the sequence of vehicle action requests while the user is disposed within the vehicle; and the step of taking the action includes taking the action, via instructions provided by the processor, when the sequence of vehicle action requests is detected while the user is disposed within the vehicle.

Also in one embodiment, the method further includes storing the sequence of vehicle action requests, along with an identification for the user, before the user enters the vehicle.

Also in one embodiment, the step of storing the sequence of vehicle action requests includes storing the sequence of vehicle action requests, along with a MAC address for a mobile phone of the user, before the user enters the vehicle.

Also in one embodiment, the step of taking an action includes automatically controlling a vehicle action, via instructions provided by the processor, when the sequence of inputs is detected while the user is disposed within the vehicle.

Also in one embodiment, the step of taking an action includes automatically monitoring a location and movement of the vehicle, via instructions provided by the processor, when the sequence of inputs is detected while the user is disposed within the vehicle.

Also in one embodiment, the step of taking an action includes automatically communicating with a law enforcement authority regarding the vehicle, via instructions provided by the processor, when the sequence of inputs is detected while the user is disposed within the vehicle.

In another exemplary embodiment, a system is provided for use in connection with a vehicle. The system includes a detection module and a processing module. The detection module is configured to at least facilitate detecting when a user is disposed within a vehicle. The processing module is coupled to the detection module, and is configured to at least facilitate: identifying, via a processor, the user; retrieving, from a memory, a sequence of inputs that is associated with the identified user as a trigger for a customized silent alarm feature for the user; monitoring for the sequence of inputs while the user is disposed within the vehicle; and taking an action, via instructions provided by the processor, when the sequence of inputs is detected while the user is disposed within the vehicle.

Also in one embodiment, the detection module is configured to detect an electronic device associated with the user that is disposed within the vehicle; and the processing module is configured to at least facilitate: identifying an identifier associated the electronic device; retrieving, from a memory, the sequence of inputs that is associated with the identifier; monitoring the sequence of inputs while the electronic device is disposed within the vehicle; and taking the action, via instructions provided by the processor, when the sequence of inputs is detected while the electronic device is disposed within the vehicle.

Also in one embodiment, the electronic device includes a mobile phone associated with the user; and the identifier includes a media access control (MAC) address of the mobile phone.

Also in one embodiment, the sequence of inputs includes a sequence of vehicle action requests that have been pre-programmed by the user for the customized silent alarm feature for the user; and the processing module is configured to at least facilitate: retrieving, from the memory, the sequence of vehicle action requests for the user; monitoring for the sequence of vehicle action requests while the user is disposed within the vehicle; and taking the action, via instructions provided by the processor, when the sequence of vehicle action requests is detected while the user is disposed within the vehicle.

Also in one embodiment, the processing module is configured to at least facilitate providing, via the processor, instructions for automatically controlling a vehicle action when the sequence of inputs is detected while the user is disposed within the vehicle.

Also in one embodiment, the processing module is configured to at least facilitate providing, via the processor, instructions for automatically monitoring a location and movement of the vehicle when the sequence of inputs is detected while the user is disposed within the vehicle.

Also in one embodiment, the processing module is configured to at least facilitate providing, via the processor, instructions for automatically controlling a vehicle action, via instructions provided by the processor, when the sequence of inputs is detected while the user is disposed within the vehicle.

In another exemplary embodiment, a vehicle is provided that includes a sensor and a processor. The sensor is configured to at least facilitate detecting when a user is disposed within the vehicle. The processor is coupled to the sensor, and is configured to at least facilitate: identifying the user; retrieving, from a memory, a sequence of inputs that is associated with the identified user as a trigger for a customized silent alarm feature for the user; monitoring for the sequence of inputs while the user is disposed within the vehicle; and providing instructions for taking an action when the sequence of inputs is detected while the user is disposed within the vehicle.

Also in one embodiment, the sensor is configured to detect an electronic device associated with the user that is disposed within the vehicle; and the processor is configured to at least facilitate: identifying an identifier associated the electronic device; retrieving, from a memory, the sequence of inputs that is associated with the identifier; monitoring the sequence of inputs while the electronic device is disposed within the vehicle; and taking the action, via instructions provided by the processor, when the sequence of inputs is detected while the electronic device is disposed within the vehicle.

Also in one embodiment, the electronic device includes a mobile phone associated with the user; and the identifier includes a media access control (MAC) address of the mobile phone.

Also in one embodiment, the sequence of inputs includes a sequence of vehicle action requests that have been pre-programmed by the user for the customized silent alarm feature for the user; and the processor is configured to at least facilitate: retrieving, from the memory, the sequence of vehicle action requests for the user; monitoring for the sequence of vehicle action requests while the user is disposed within the vehicle; and taking the action, via instructions provided by the processor, when the sequence of vehicle action requests is detected while the user is disposed within the vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
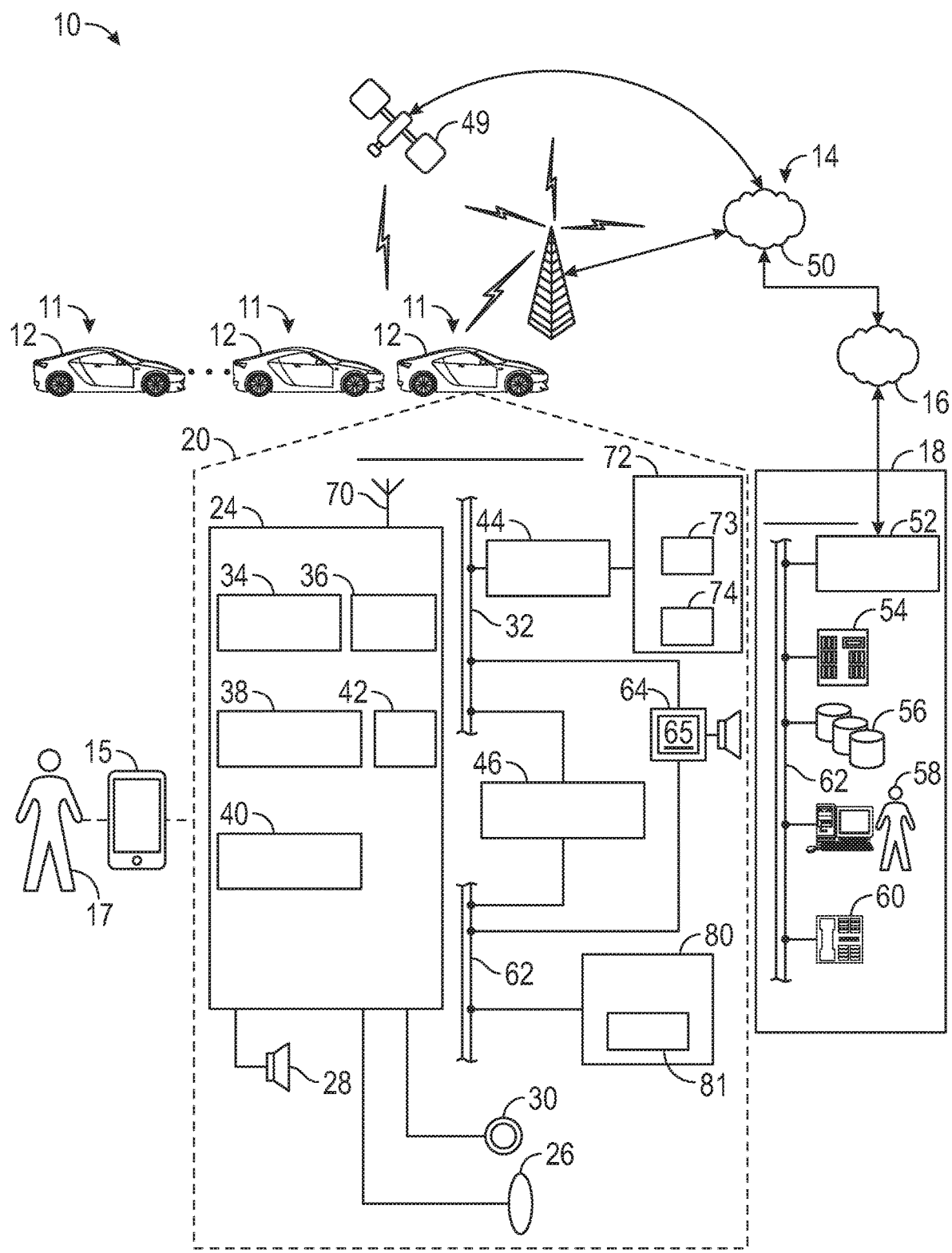
FIG. 1 is a functional block diagram of a communications system that includes a fleet of vehicles, and that is configured to provide a custom silent alarm feature for a user of the fleet of vehicles, in accordance with exemplary embodiments.

FIG. 1 is a functional block diagram of a communications system 10, in accordance with an exemplary embodiment. As described in greater detail further below, the communications system 10 includes a fleet 11 of vehicles 12. Also as described in greater detail further below, the communications system 10 is configured to provide a custom silent alarm feature for a user 17 of the fleet 11 of vehicles 12, in accordance with exemplary embodiments.

As depicted in FIG. 1, the communications system 10 generally includes the above-referenced vehicles 12 in the fleet 11, along with one or more wireless carrier systems 14, one or more land networks 16, and one or more remote servers 18. As described in greater detail further below, in various embodiments, the communications system 10 detects and communicates with an electronic device 15 of the user 17, and provides for one or more responsive actions when a particular stored sequence of inputs associated with the user 17 (via his or her electronic device 15) is performed while the user 17 is disposed within the vehicle 12 (e.g., in activating a custom silent alarm in an emergency situation, for example in which the user is being held against his or her will inside the vehicle 12).

It should be appreciated that the overall architecture, setup and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

In various embodiments, each vehicle 12 may be any type of mobile vehicle such as a motorcycle, car, truck, recreational vehicle (RV), boat, plane, farm equipment, or the like, and is equipped with suitable hardware and software that enables it to communicate over communications system 10. As shown in FIG. 1, in various embodiments the vehicle hardware 20 is disposed within a body 19 of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including the connection and communication with the electronic device(s) 15 of users 17 of the vehicles 12, and a custom silent alarm feature for the users 17. In various embodiments, the electronic device 15 may include a mobile phone, such as a smart phone. In certain other embodiments, the device 15 may include, by way of example, various other different consumer electronic/mobile devices, such as a keyfob, a laptop, a smart wearable device, a tablet computer, a network computer, and/or one or more other electronic devices and/or combinations thereof.

In various embodiments, the telematics unit 24 detects and communicates with the electronic device 15 while connected to a wireless network within a wireless range of the vehicle 12. In various embodiments, the telematics unit 24 and each electronic device 15 exchange data (either directly and/or indirectly via the remote server 18), including the exchange of an identifier of the electronic device 15, such as a media access control (MAC) address for a mobile phone. Also in various embodiments, the telematics unit 24 retrieves, from a computer memory (e.g., of the remote server 18, described below) a stored sequence of inputs that are associated with the electronic device 15 (and therefore the user 17) for implementing the custom silent alarm feature for the user 17. Specifically, as discussed in greater detail further below, in various embodiments, whenever the user 17 is disposed in any of the vehicles 12 in the fleet 11 (e.g., as determined by detection of the user 17's electronic device 15 inside the vehicle 12), the telematics unit 24 monitors for the stored sequence of inputs while the user 17 is inside the vehicle 12. In various embodiments, when the user 17 provides inputs that match the stored sequence of inputs, then this indicates an alarm situation (e.g., the user 17 being held against his or her will inside the vehicle 12), and then appropriate action is undertaken (e.g., controlling movement and/or other action of the vehicle 12, monitoring a location and movement of the vehicle 12, notifying appropriate authorities, and so on). In various embodiments, this custom silent alarm feature is provided in accordance with the steps of the process 300 described further below in connection with FIG. 3.

In addition, in various embodiments, the telematics unit 24 may also provide other services, such as, by way of example: turn-by-turn directions and other navigation-related services provided in conjunction with the GPS chipset/component 42, emergency assistance services, information requests from the users of the vehicle 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

Vehicle sensors 72, connected to various sensor interface modules 44 are operatively connected to the vehicle bus 32. In various embodiments, the vehicle sensors 72 include detection sensors 73 and user input sensors 74, described below. In various embodiments, the vehicle sensors 72 may also include any number of other sensors, such as by way of example, wheel speed sensors, accelerometers, steering angle sensors, braking system sensors, gyroscopes, magnetometers, emission detection, and/or control sensors, and the like. Example sensor interface modules 44 include powertrain control, climate control, and body control, to name but a few.

In various embodiments, the detection sensors 73 detect and communicate with the user 17's electronic device 15. For example, in various embodiments, the detection sensors 73 detect the electronic device 15 and receive a unique identifier thereof (e.g., a MAC address of a mobile phone) in order to help identify the user 17 of the vehicle 12. In certain embodiments, the detection sensors 73 include one or more Bluetooth low energy (BLE) sensors 73 that are disposed within or on the vehicle 12 (e.g., on or within the body 19 of the vehicle 12). In certain embodiments, the detection sensors 73 are utilized in connection with one or more short-range wireless connection (SRWC) protocols (e.g., Bluetooth/Bluetooth Low Energy, or Wi-Fi).

Also in various embodiments, the input sensors 74 are utilized to detect inputs from the user 17 with respect to operation of various vehicle components. For example, in various embodiments, the input sensors 74 detect requests by the user 17 to unlock or lock one or more doors of the vehicle 12, start the vehicle 12, roll one or more windows of the vehicle 12 up or down, adjust vehicle mirrors, adjust vehicle lighting, adjust vehicle climate control, and so on. In various embodiments, the input sensors 74 are part of and/or coupled to one or more of the hardware components 20 and/or controls 30, and/or to one or more other vehicle modules 80, such as one or more body control modules, engine control modules, vehicle control modules, and/or other modules that control different functionality for the vehicle 12, such as the vehicle 12's door locks, windows, mirrors, lighting, climate control, engine, and the like, that may be connected to one another and to telematics unit 24 via the communications bus 62. For example, in various embodiments, the input sensors 74 may be part of and/or coupled to controls 30 for hardware components 20 and/or various input devices 81 for use other vehicle modules 80, such as one or more touch screens, push buttons, dials, switches, knobs, levers, or the like. In various embodiments, the input sensors 74 are used to not only control the vehicle functionality for the hardware components 20 and/or other vehicle modules 80 as requested by the user 17, but also to monitor the user 17 inputs for comparison against a pre-programmed, stored sequence of inputs that are associated with an alarm situation for the user 17 (e.g., if the user 17 is being held against his or her will in a vehicle 12, and so on). Also in various embodiments, this comparison of inputs is performed via a processor, such as the processor 38 of the telematics unit 24.

The wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. In various embodiments, the database 56 of the remote server 18 comprises a computer memory that stores the identifiers (e.g., MAC addresses) for the respective electronic devices 15 of the various users 17 that utilize the vehicles 12 in the fleet 11, along with the pre-programmed sequence of inputs for each of the respective users 17 that would signal an alarm event for the user 17. Also in various embodiments, the database 56 may also store additional information such as, by way of example, subscriber profile records, subscriber behavioral patterns, or any other pertinent subscriber and/or user information. Although the illustrated example has been described as it would be used in conjunction with a remote server 18 that is manned, it will be appreciated that the remote server 18 can be any central or remote facility, manned or unmanned, mobile or fixed, to or from which it is desirable to exchange voice and data.

Figure 2:
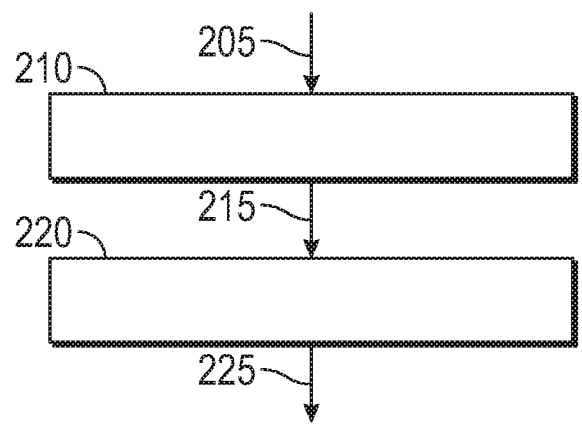
FIG. 2 is a block diagram of modules of the communications system of FIG. 1, in accordance with exemplary embodiments.

FIG. 2 provides a functional block diagram for modules of the communications system 10 of FIG. 1, in accordance with exemplary embodiments. In various embodiments, each module includes and/or utilizes computer hardware, for example via one or more computer processors and memory. As depicted in FIG. 2, in various embodiments, the communications system 10 generally includes a detection module 210 and a processing module 220. In various embodiments, the detection module 210 and processing module 220 are disposed, at least in part, onboard the vehicle 12. In certain embodiments, the processing module may be disposed, at least in part, as part of the remote server 18 of FIG. 1.

In various embodiments, the detection module 210 detects and communicates with the user 17's electronic device 15 of FIG. 1. In various embodiments, the detection module 210 utilizes one or more detection sensors 73 of FIG. 1 (e.g., BLE sensors, in certain embodiments) that obtain an identifier (e.g., a MAC address) for the electronic device 15. In addition, in certain embodiments, the detection module 210 also utilizes one or more input sensors 74 of FIG. 1 for monitoring inputs provided by the user 17 (e.g., for requests by the user 17 to unlock or lock one or more doors of the vehicle 12, start the vehicle 12, roll one or more windows of the vehicle 12 up or down, adjust vehicle mirrors, adjust vehicle lighting, adjust vehicle climate control, and so on).

Also in various embodiments, the detection module 210 provides information pertaining to the data (including the detection of the electronic device 15 and the identifier thereof, and the detected user inputs or requests for controlling vehicle functionality) as outputs 215 of the detection module 210 for use by the processing module 220, for example as discussed below.

In various embodiments, the processing module 220 utilizes the data from the detection module 210 (e.g., the electronic device 15 identifier and the user requests) as inputs 215 for the processing module 220, and controls a custom silent alarm feature for the vehicle 12 based on the data. Specifically, in various embodiments, the processing module 220 retrieves, from a memory, a pre-programmed, stored sequence of inputs associated with the user 17 (e.g., associated with the identifier of the electronic device 15 of the user 17), and takes appropriate action when this sequence of inputs is detected while the user 17 is in the vehicle 12. In various embodiments, these steps are utilized by one or more processors (such as the processor 38 of the vehicle 12) using computer memory (e.g., the database/memory 56 of the remote server 18), for example in accordance with the process 300 described below in connection with FIG. 3. In certain embodiments, such instructions are provided by the processing module 220 as outputs 225 depicted in FIG. 2 to the one or more of the hardware components 20 and/or other vehicle modules 80 of FIG. 1 (e.g., an engine control module, a body control module, or so on) for controlling one or more vehicle actions (e.g., controlling vehicle movement), and/or to the remote server 18 (e.g., to initiate monitoring of the vehicle 12 and/or to notify appropriate authorities, and so on).

Figure 3:
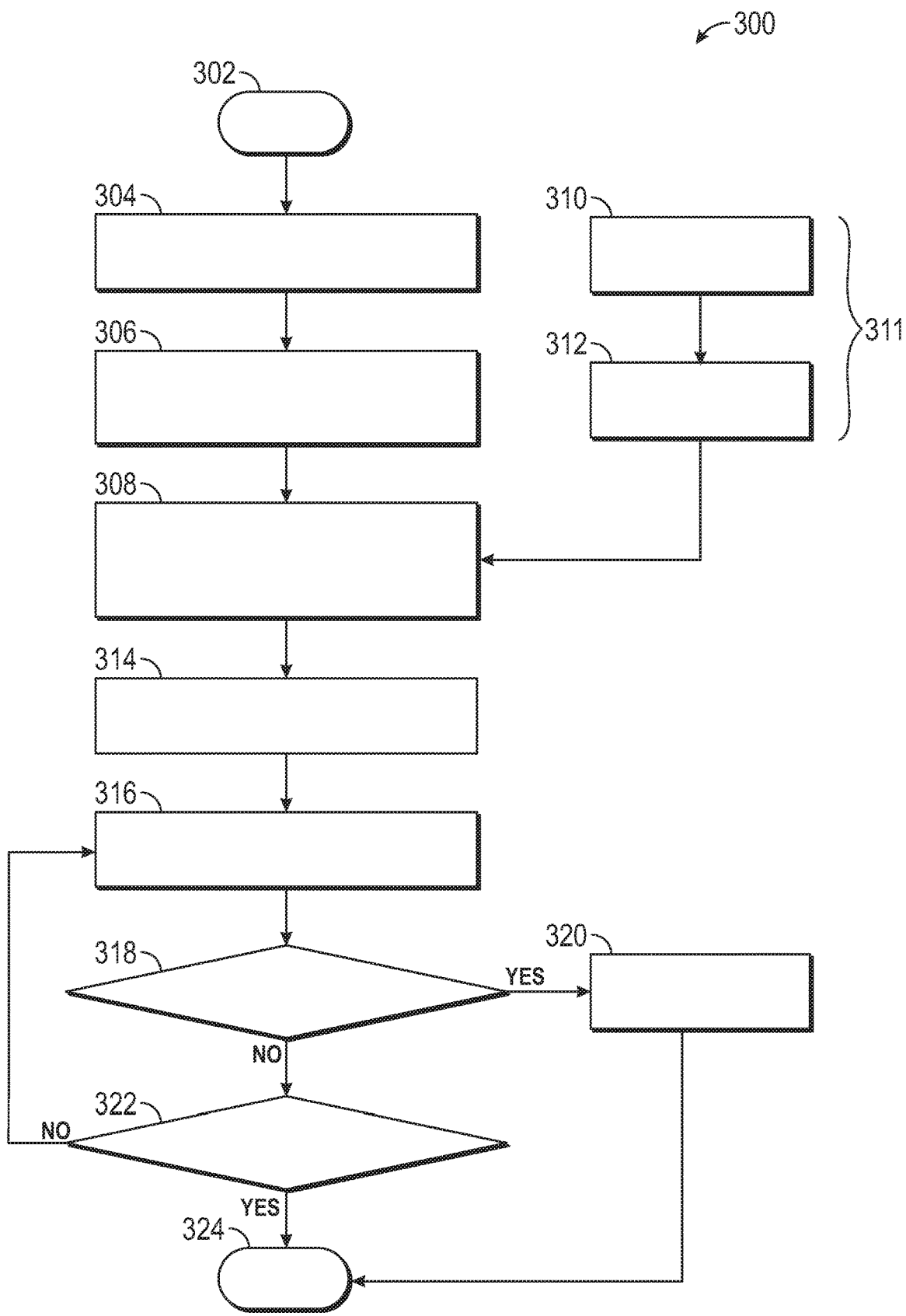
FIG. 3 is a flowchart of a process to provide a custom silent alarm feature for a user of the fleet of vehicles, and that can be used in connection with the communications system of FIGS. 1 and 2, including the vehicles thereof of FIG. 1 and the modules of FIG. 2, in accordance with exemplary embodiments.

FIG. 3 is a flowchart of a process 300 for controlling a custom silent alarm feature for a vehicle, in accordance with various embodiments. In various embodiments, the process 300 can be used in connection with the communications system 10 of FIG. 1, including the vehicles 12 and the remote server 18 thereof, the components thereof of FIG. 1, and the modules thereof of FIG. 2, in accordance with exemplary embodiment.

As depicted in FIG. 3, in various embodiments the process 300 begins at step 302. In certain embodiments, the process 300 begins when one or more users 17 of the vehicle 12 approaches or enters the vehicle 12, or turns on the vehicle 12 and/or an ignition therefor (e.g. by turning a key, engaging a keyfob or start button, and so on). In certain embodiments, the steps of the process 300 are performed continuously during operation of the vehicle 12.

In various embodiments, an electronic device is detected at step 304. In various embodiments, one or more detection sensors 73 of FIG. 1 (e.g., one or more BLE sensors) detect one or more electronic devices 15 of the user 17, via the detection module 210 of FIG. 2. In certain embodiments, a mobile phone (e.g., a smart phone) is detected by the detection sensors 73 inside the vehicle 12. In certain other embodiments, one or more other electronic devices (e.g., a keyfob, tablet, computer, wearable device, or the like) are detected inside the vehicle 12.

An identifier is obtained for the electronic device 15 at step 306. In various embodiments, one or more detection sensors 73 (e.g., one or more BLE sensors) of FIG. 1 obtain the identifier from the electronic device 15 via communication with the electronic device 15 (e.g., a Bluetooth, WiFi, and/or other short range wireless communications protocol), via the detection module 210 of FIG. 2. Also in certain embodiments, the electronic device 15 comprises a mobile phone (e.g., a smart phone), and a unique MAC address for the mobile phone is obtained (and identified) for the mobile phone at step 306.

In various embodiments, at step 308, the identifier of step 306 is compared with other stored identifiers in a computer database. For example, in certain embodiments, a processor (such as the processor 38 of FIG. 8) searches to determine whether the identifier of step 306 is stored (e.g., as being associated with a sequence of inputs for a user 17) in a computer memory of a database (such as the database 56 of FIG. 1), via the processing module 220 of FIG. 2.

In various embodiments, a customized sequence of inputs is programmed and stored during an "offline" sequence (or sub-process) 311 that occur prior to the current vehicle drive (e.g., prior to the current iteration of step 302). Specifically, in various embodiments, prior to the user 17 entering the vehicle 12 in the current vehicle drive (i.e., prior to step 302 of a current iteration), the user 17 is asked to select a customized sequence of user inputs for vehicle control actions to be used in case an emergency situation arises in the future. Also in various embodiments, the user 17 selects his or her personalized sequence of inputs while the communications system 10 or vehicle 12 is in a "learning mode", and the resulting sequence of inputs are pre-programmed by a processor (such as the processor 38 of FIG. 1) in step 310. In various embodiments, the sequence of inputs includes an ordered combination of multiple vehicle control requests that may include requests such as to unlock or lock one or more doors of the vehicle 12, start the vehicle 12, roll one or more windows of the vehicle 12 up or down, adjust vehicle mirrors, adjust vehicle lighting, adjust vehicle climate control, and so on. For example, one user may select a sequence of (1) rolling down a front driver side window, followed by (2) locking the doors, followed by (3) adjusting a rear-view mirror—while other users may select different sequences of vehicle control requests, and so on. It will be appreciated that the number and/or nature of the vehicle control requests for different users' respective chosen sequences may vary in different embodiments. Also in various embodiments, during step 312 the pre-programmed sequence of inputs for the particular user 107 is stored in a memory (such as the database 56 of FIG. 1), also prior to the user 17 entering the vehicle 12 (e.g., prior to step 302 of a current iteration).

Returning back to the steps of the current vehicle drive, following step 308, in various embodiments the user 17's stored sequence of inputs is obtained at step 314. Specifically, in various embodiments, a processor (such as the processor 38 of FIG. 1) obtains, from a memory (such as the database 56 of FIG. 1) the pre-programmed, stored sequence of inputs associated with the electronic device 15 identifier of step 306 (i.e., that server as the custom silent alarm sequence of inputs for the user 17).

The vehicle monitors for the sequence of inputs at 316. Specifically, in various embodiments, the detection sensors 73 of FIG. 1 detect current inputs from the user 17 during the current vehicle drive, including current requests for vehicle actions (such as to unlock or lock one or more doors of the vehicle 12, start the vehicle 12, roll one or more windows of the vehicle 12 up or down, adjust vehicle mirrors, adjust vehicle lighting, adjust vehicle climate control, and so on), via the detection module 210. Also in various embodiments, as part of step 316, a processor (such as the processor 38 of FIG. 1) compares the current inputs with the pre-programmed, stored inputs for the custom silent alarm feature for the user 17, via the processing module 220 of FIG. 1.

During step 318, a determination is made as to whether the stored sequence has been detected. Specifically, in various embodiments, a processor (such as the processor 38 of FIG. 1) determines whether the current inputs detected during step 316 match the pre-programmed, stored sequence of inputs retrieved from memory during step 314 as representative as a custom silent alarm trigger for the particular user 17 that is disposed inside the vehicle 12.

If it is determined during step 318 that the current inputs detected during step 316 match the pre-programmed, stored sequence of inputs retrieved from memory during step 314 for the user 17 that is disposed inside the vehicle 12, then one or more responsive actions are performed at step 320. In certain embodiments, a processor (such as the processor 38 of FIG. 1) provides instructions to one or more vehicle systems (such as one or more of the hardware components 20 and/or the other vehicle modules 80 of FIG. 1) to control one or more actions of the vehicle 12, via the processing module 220 of FIG. 2. For example, in certain embodiments, instructions are provided to an engine control module and/or body control module to control movement of the vehicle 12, such as to slow and/or stop the vehicle (for example by automatically engaging the brakes, automatically controlling an accelerator pedal, automatically turning off an engine or preventing the engine from turning on, or the like). In certain embodiments, instructions are provided to the remote server 18 to monitor a location and movement of the vehicle 12 (e.g., via communication with a GPS or other location system). In certain embodiments, instructions are provided to the telematics unit 24 and/or to the remote server 18 to contact one or more appropriate authorities (e.g., police and/or other law enforcement and/or rescue officials) to alert them of the situation involving the user 17 inside the vehicle 12. In certain embodiments, the process ends at 324 once the action(s) are complete (e.g., once the situation is resolved).

In various embodiments, the action(s) of step 320, and the various steps leading up to the action(s) (e.g., including steps 302-318 in addition to step 320) are performed in a "silent" manner without any sound, noise, notices, and/or other audio and/or visual notification for occupants of the vehicle 12. Accordingly, in various embodiments, this serves as a "silent" alarm that can be implemented by the user 17 in secret without knowledge of any other occupants of the vehicle 12 (e.g., that may be holding the user 17 against his or her will and/or that may be otherwise hostile to the user 17).

Returning back to step 318, if it is determined instead that the current inputs detected during step 316 do not match the pre-programmed, stored inputs of step 314, then the actions described above are not taken, and the process proceeds instead to step 322. During step 322, in various embodiments, a determination is made by a processor (e.g., the processor 38 of FIG. 1) as to whether monitoring for the sequence of inputs is still required. If it is determined in step 322 that further monitoring for the sequence of inputs is still required (e.g., in certain embodiments, if the vehicle drive is still ongoing), then the process returns to step 316, and the monitoring continues. Conversely, once it is determined during an iteration of step 322 that further monitoring for the sequence of inputs is no longer required (e.g., in certain embodiments, if the vehicle drive is complete, such as if the engine is turned off or the user 17 has exited the vehicle 12), then the process terminates at 324.

Accordingly, in accordance with various embodiments, methods, systems, and vehicles are provided that provide for a custom silent alarm feature for users of a fleet of vehicles. In various embodiments, when a user's electronic device (e.g., a mobile phone) is detected inside any of the vehicles in the fleet, a unique identifier (e.g., a MAC address) for the electronic device is obtained. Also in various embodiments, a pre-programmed, stored sequence of inputs associated with the user 17's electronic device 15 are downloaded, and monitoring is performed for the sequence of inputs. If the sequence of inputs is detected while the user is disposed inside the vehicle, then this corresponds to the user's customized alarm trigger sequence, indicating that an undesirable situation may be occurring (e.g., the user being held against his or her will inside the vehicle). Accordingly, when the sequence of events is detected while the user is disposed inside the vehicle, one or more actions are taking (e.g., by controlling movement of the vehicle and/or one or more other vehicle actions, monitoring a location and movement of the vehicle, notifying law enforcement and/or other appropriate authorities, and so on).

It will be appreciated that the systems and methods may vary from those depicted in the Figures and described herein. For example, the communications system of FIG. 1, including the remote server, the vehicles, communications networks, and/or components thereof, may vary from that depicted in FIG. 1 and/or described herein, in various embodiments. It will similarly be appreciated that the modules may vary from the depictions in FIG. 2 and the accompanying descriptions. It will also be appreciated that the process (and/or subprocesses) disclosed herein may differ from those described herein and/or depicted in FIG. 3, and/or that steps thereof may be performed simultaneously and/or in a different order as described herein and/or depicted in FIG. 3, among other possible variations. Also, while the systems and methods are depicted for a vehicle as being part of a fleet, it will be appreciated that in certain embodiments the systems and method may be implemented in connection with a user's single vehicle.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:
1. A method comprising:
   detecting, via one or more detection sensors via a short range wireless communication protocol, a media access control (MAC) address for a mobile phone of a user that is disposed within a vehicle;
   identifying, via a processor, the user by comparing the MAC address with other stored identifiers in a computer database;
   retrieving, from a memory, a sequence of inputs that is associated with the identified user as a trigger for a customized silent alarm feature for the user;

monitoring for the sequence of inputs while the user is disposed within the vehicle; and
taking an action by restricting movement of the vehicle, via instructions provided by the processor and automatically implemented via one or more of a braking system, accelerator pedal, or engine of the vehicle, when the sequence of inputs is identified while the user is disposed within the vehicle, wherein:

wherein:
the sequence of inputs comprises a sequence of vehicle action requests that have been pre-programmed by the user for the customized silent alarm feature for the user;
the step of retrieving the sequence of inputs comprises retrieving, from the memory, the sequence of vehicle action requests for the user;
the step of monitoring for the sequence of inputs comprises monitoring for the sequence of vehicle action requests while the user is disposed within the vehicle; and
the step of taking the action comprises taking the action, via instructions provided by the processor, when the sequence of vehicle action requests is detected while the user is disposed within the vehicle.

2. The method of claim 1, further comprising:
storing the sequence of vehicle action requests for the user, along with the MAC address for the mobile phone of the user, before the user enters the vehicle.

3. The method of claim 1, wherein the step of taking an action further comprises automatically communicating with a law enforcement authority regarding the vehicle, via instructions provided by the processor, when the sequence of inputs is detected while the user is disposed within the vehicle.

4. A system for use in connection with a vehicle, the system comprising:
a detection module comprising one or more sensors configured to at least facilitate detecting, via a short range wireless communication protocol, a media access control (MAC) address for a mobile phone of a user disposed within a vehicle; and
a processing module comprising a processor that is coupled to the one or more sensors of the detection module and that is configured to at least facilitate:
identifying the user by comparing the MAC address with other stored identifiers in a computer database;
retrieving, from a memory, a sequence of inputs that is associated with the identified user as a trigger for a customized silent alarm feature for the user;
monitoring for the sequence of inputs while the user is disposed within the vehicle; and
taking an action by restricting movement of the vehicle, via instructions provided by the processor and automatically implemented via one or more of a braking system, accelerator pedal, or engine of the vehicle, when the sequence of inputs is detected while the user is disposed within the vehicle, wherein:
the sequence of inputs comprises a sequence of vehicle action requests that have been pre-programmed by the user for the customized silent alarm feature for the user; and
the processing module is configured to at least facilitate:
retrieving, from the memory, the sequence of vehicle action requests for the user;
monitoring for the sequence of vehicle action requests while the user is disposed within the vehicle; and
taking the action, via instructions provided by the processor, when the sequence of vehicle action requests is detected while the user is disposed within the vehicle.

5. A vehicle comprising:
one or more sensors configured to at least facilitate detecting, via a short range wireless communication protocol, a media access control (MAC) address for a mobile phone of a user disposed within the vehicle; and
a processor that is coupled to the sensor and that is configured to at least facilitate:
identifying the user by comparing the MAC address with other stored identifiers in a computer database;
retrieving, from a memory, a sequence of inputs that is associated with the identified user as a trigger for a customized silent alarm feature for the user;
monitoring for the sequence of inputs while the user is disposed within the vehicle; and
taking an action by restricting movement of the vehicle, via instructions provided by the processor and automatically implemented via one or more of a braking system, accelerator pedal, or engine of the vehicle, when the sequence of inputs is detected while the user is disposed within the vehicle, wherein:
the sequence of inputs comprises a sequence of vehicle action requests that have been pre-programmed by the user for the customized silent alarm feature for the user; and
the processor is configured to at least facilitate:
retrieving, from the memory, the sequence of vehicle action requests for the user;
monitoring for the sequence of vehicle action requests while the user is disposed within the vehicle; and
taking the action, via instructions provided by the processor, when the sequence of vehicle action requests is detected while the user is disposed within the vehicle.

6. The method of claim 1, wherein the step of taking the action comprises taking action by restricting movement of the vehicle, via instructions provided by the processor and automatically implemented by automatic application of brakes of the braking system of the vehicle, when the sequence of inputs is identified while the user is disposed within the vehicle.

7. The method of claim 1, wherein the step of taking the action comprises taking action by restricting movement of the vehicle, via instructions provided by the processor and automatically implemented by automatic control of the accelerator pedal of the vehicle, when the sequence of inputs is identified while the user is disposed within the vehicle.

8. The method of claim 1, wherein the step of taking the action comprises taking action by restricting movement of the vehicle, via instructions provided by the processor and automatically implemented by automatically turning off the engine of the vehicle, when the sequence of inputs is identified while the user is disposed within the vehicle.

9. The method of claim 1, wherein the step of taking the action comprises taking action by restricting movement of the vehicle, via instructions provided by the processor and automatically implemented by automatically preventing the engine of the vehicle from being turned on, when the sequence of inputs is identified while the user is disposed within the vehicle.

10. The system of claim 4, wherein the processing module is further configured to at least facilitate taking the action by restricting movement of the vehicle, via instructions provided by the processor and automatically implemented by automatic application of brakes of the braking system of the vehicle, when the sequence of inputs is identified while the user is disposed within the vehicle.

11. The system of claim 4, wherein the processing module is further configured to at least facilitate taking the action by restricting movement of the vehicle, via instructions provided by the processor and automatically implemented by automatic control of the accelerator pedal of the vehicle, when the sequence of inputs is identified while the user is disposed within the vehicle.

12. The system of claim 4 wherein the processing module is further configured to at least facilitate taking the action by restricting movement of the vehicle, via instructions provided by the processor and automatically implemented by automatically turning off the engine of the vehicle, when the sequence of inputs is identified while the user is disposed within the vehicle.

13. The system of claim 4, wherein the processing module is further configured to at least facilitate taking the action by restricting movement of the vehicle, via instructions provided by the processor and automatically implemented by automatically preventing the engine of the vehicle from being turned on, when the sequence of inputs is identified while the user is disposed within the vehicle.

14. The vehicle of claim 5, wherein the processor is further configured to at least facilitate taking the action by restricting movement of the vehicle, via instructions provided by the processor and automatically implemented by automatic application of brakes of the braking system of the vehicle, when the sequence of inputs is identified while the user is disposed within the vehicle.

15. The vehicle of claim 5, wherein the processor is further configured to at least facilitate taking the action by restricting movement of the vehicle, via instructions provided by the processor and automatically implemented by automatic control of the accelerator pedal of the vehicle, when the sequence of inputs is identified while the user is disposed within the vehicle.

16. The vehicle of claim 5, wherein the processor is further configured to at least facilitate taking the action by restricting movement of the vehicle, via instructions provided by the processor and automatically implemented by automatically turning off the engine of the vehicle, when the sequence of inputs is identified while the user is disposed within the vehicle.

17. The vehicle of claim 5, wherein the processor is further configured to at least facilitate taking the action by restricting movement of the vehicle, via instructions provided by the processor and automatically implemented by automatically preventing the engine of the vehicle from being turned on, when the sequence of inputs is identified while the user is disposed within the vehicle.

* * * * *